(12) United States Patent
Dunham et al.

(10) Patent No.: US 7,654,069 B1
(45) Date of Patent: Feb. 2, 2010

(54) BALER SLIDER FRAME FOR MOUNTING ACCESSORIES TO A CROP PICKUP DEVICE

(75) Inventors: Lile J. Dunham, Grinnell, IA (US); Eric Woodford, Redwood Falls, MN (US); Philip Egging, Reasnor, IA (US)

(73) Assignee: Vermeer Manufacturing Co., Pella, IA (US)

( * ) Notice: Subject to any disclaimer, the term of this patent is extended or adjusted under 35 U.S.C. 154(b) by 0 days.

(21) Appl. No.: 12/331,860

(22) Filed: Dec. 10, 2008

(51) Int. Cl.
*A01D 43/00* (2006.01)
(52) U.S. Cl. ..................................... 56/190
(58) Field of Classification Search .............. 56/190, 56/344, 364, 372, 341; 100/13, 5
See application file for complete search history.

(56) References Cited

U.S. PATENT DOCUMENTS

| | | | |
|---|---|---|---|
| 2,872,772 A * | 2/1959 | Nolt | ............... 56/364 |
| 4,015,410 A | 4/1977 | Smith | |
| 4,411,127 A | 10/1983 | Diederich | |
| 4,495,756 A | 1/1985 | Greiner | |
| 4,516,389 A * | 5/1985 | Core | ............... 56/341 |
| 4,524,576 A * | 6/1985 | Probst | ............... 56/372 |
| 4,720,962 A | 1/1988 | Klinner | |
| 4,766,717 A | 8/1988 | Thomann | |
| 4,910,940 A | 3/1990 | Grady | |
| 5,293,732 A | 3/1994 | Vogelgesang | |
| 5,519,990 A | 5/1996 | Rodewald | |
| 5,848,523 A | 12/1998 | Engel | |
| 6,012,271 A | 1/2000 | Wilkens | |
| 6,116,002 A | 9/2000 | Roth | |
| 6,295,797 B1 | 10/2001 | Naaktgeboren | |
| 6,370,856 B1 | 4/2002 | Engel | |
| 6,526,736 B1 | 3/2003 | Anstey | |
| 6,581,364 B2 | 6/2003 | Lucand | |
| 6,601,375 B1 | 8/2003 | Grahl | |
| 6,644,006 B1 | 11/2003 | Merritt | |
| 6,651,418 B1 | 11/2003 | McClure | |
| 6,679,041 B2 | 1/2004 | Viaud | |
| 6,688,092 B2 | 2/2004 | Anstey | |
| 6,769,239 B1 | 8/2004 | Webb | |
| 6,810,650 B2 | 11/2004 | McClure | |
| 6,877,304 B1 | 4/2005 | Smith | |
| 6,935,094 B1 * | 8/2005 | McClure | ............... 56/190 |

(Continued)

FOREIGN PATENT DOCUMENTS

DE    202005020779    11/2006

(Continued)

OTHER PUBLICATIONS 5 sheets showing a Case IH LBX422 big baler—from PROFI and Farm Machinery magazine dated Sep. 9, 2005.

*Primary Examiner*—Árpád Fábián-Kovács
(74) *Attorney, Agent, or Firm*—Sturm & Fix LLP

(57) ABSTRACT

A slide frame for a baler is provided for mounting one or more accessories such as a wind guard and/or a rotor, powered or non-powered, for assisting a pickup on a baler to pick up cut crops from the ground and deliver such crops to the inlet of a baling chamber. The slide frame is mounted in such a way as to automatically space each respective accessory a predetermined place with respect to the crop pickup device.

20 Claims, 14 Drawing Sheets

U.S. PATENT DOCUMENTS

| | | |
|---|---|---|
| 6,948,300 B1 | 9/2005 | Bandstra |
| 6,962,041 B1 | 11/2005 | Taylor |
| 6,988,354 B1 | 1/2006 | Pargmann |
| 7,107,748 B2 | 9/2006 | McClure |
| 7,124,568 B2 | 10/2006 | Hotaling |
| 2005/0091959 A1 | 5/2005 | Viaud |
| 2006/0277888 A1 | 12/2006 | Erdmann |

FOREIGN PATENT DOCUMENTS

| | | |
|---|---|---|
| EP | 1252813 | 10/2002 |
| EP | 1151657 | 6/2006 |
| EP | 1252814 | 6/2006 |
| EP | 1306003 | 6/2006 |
| EP | 1733609 | 12/2006 |

* cited by examiner

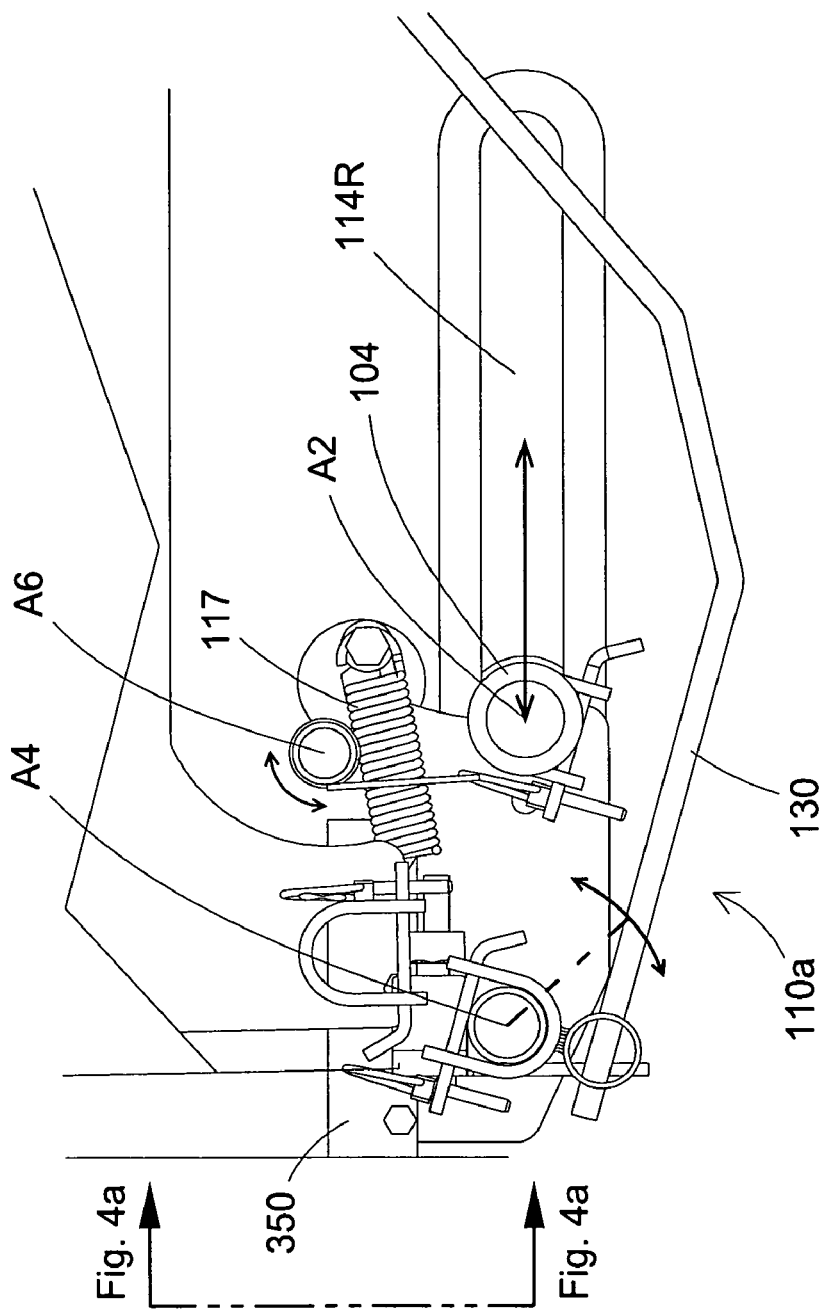

Pickup Assembly Down

Powered Rotor Down

Powered Rotor Up

US 7,654,069 B1

BALER SLIDER FRAME FOR MOUNTING ACCESSORIES TO A CROP PICKUP DEVICE

CROSS REFERENCE TO RELATED APPLICATIONS

None

BACKGROUND OF THE INVENTION

Field of the Invention

The present invention relates generally to agricultural equipment, and more specifically to a mounting for a rotor for use in combination with a pickup portion of a baler or the like to increase baling capacity and prevent plugging of the input of a baler.

Balers are used for many different crops. Most balers are used to bale hay. Hay is usually classified as any type of grass or legume, such as alfalfa, that is fed to livestock such as cows and horses.

Balers also bale straw, which is of course the part of the plant above ground that is left after grain such as wheat, oats, barley or the like are harvested, for example, which a combine harvester. A primary use for straw is for bedding for animals. Straw is also commonly used as mulch for gardens or the like.

A third category of crop material which is baled using a baler is a stiff stalk crop, such as corn stover including corn stalks which are typically baled after the corn is removed from the stalk, such as with a combine harvester which saves only the corn kernels or with a corn picker, which saves only the corn while it is still on a cob. It is this third category of crop material which is the most problematic to bale, primarily because of the stiff long pieces of plant stalk. Corn stalks are commonly used as feed for animals, such as cattle, or can be used as a raw material for making a bio-fuel, such as ethanol.

When baling corn stalks, the flow of material is not always a steady flow. Because the corn stalks do not fold together like hay and straw material, sometimes the corn stalks do not flow easily into the baler pickup. This causes the cornstalks to pile up in front of the pickup as the baler is towed through a field, causing a large pile of corn stalks to be pushed along in front of the baler pickup instead of evenly entering the baler. This requires the operator to stop the baler, reorganize the pile of cornstalks in front of the pickup of the baler and resume the baling operation. Additionally, these cornstalks can plug up the pickup of the baler so that the baler can no longer be used until such plug of material is removed, or at a minimum repositioned. This problem can occur numerous times during the process of baling a field and happens most often when the crop comprises cornstalks.

When the pickup of a baler becomes plugged with crop, the operator has a few options. Some operators will wait for the pickup to clear itself which is very damaging to the pickup; some will shake the pickup with a hydraulic lift, which is damaging to the pickup itself, some will increase and decrease the revolutions per minute of the controls of the baler which can damage the drive line and the tractor, and the most desperate operators will get out of their tractor and cab and try to clear the plug by hand. All of these methods take valuable time. Some of the methods cost money in repairs because they damage the equipment. And whenever the operator is out of the cab of the tractor, safety can be an issue.

Another problem with using a baler to bale a crop is that if the crop does not enter the pickup evenly, the bale will not be formed evenly, which devalues the bales produced and the negatively impacts the perception of quality of the baler itself because even, consistent bales are desired. This is especially true when the bales being made are large round bales. Also, uneven entry of the crop also causes extra stress on the baler, in particular of the pickup portion of the baler. This can cause premature wear and or premature failure of the components thereof.

The speed of baling is controlled to a great degree by how fast the operator can drive through the field and pickup the crop. Usually it is the pickup portion of the baler that is the limiting factor as to the speed that the baler can be towed during operation because once the crop is in the baling chamber the baler can usually handle a high capacity of crop. So although a faster pickup of the crop will increase the efficiency of the baler, operators soon learn the maximum speed that they can tow the baler for a particular crop under particular conditions and they will try to operate at such maximum speed whenever possible. Pushing beyond that optimum speed for such crop and conditions will typically cause plugging of the pickup. In general, the maximum baling speed for certain crops under the conditions existing at the time is proportional to the amount of crop material that enters evenly through the pickup portion of the baler. For certain crops, such as alfalfa, the more the crop "slips" in the pickup portion of the baler the more likely that there will be leaf shatter and leaf loss, decreasing the value of the crop. So to the extent that a pickup of a baler can be made to minimize this slippage of the crop with respect to the pickup, it will be more efficient and more of a valuable feature of such a baler.

U.S. Pat. No. 6,680,092 to Anstey et al., which is incorporated herein by reference, shows one quite complex way to mount a wind guard to a baler for allowing the wind guard to float up and down in response to the amount of flow of crop through the pickup of the baler. A simpler way to do this would be preferred if possible.

Accordingly, there is a need for a baler apparatus that overcomes the aforementioned problems with the pickup portion of balers for baling crop materials. Because existing prior art pickup systems have built in limitations as to how quickly an even flow of the crop can be moved from the ground to the baling chamber, it is desired to overcome those limitations to create a more efficient baler by creating an even flow of crop materials through the pickup portion to the baling chamber from the instant the crop materials first enter the pickup portion of the baler and consistently maintain that flow of crop materials during the use of the baler.

BRIEF SUMMARY OF THE INVENTION

An object of the present invention is to provide an apparatus for mounting accessories such as a wind guard or a rotor, powered or un-powered, for assisting a baler pickup to deliver cut crops from the ground to the inlet of a baling chamber of a baler. In the case of an accessory like a baler rotor shaft on which are mounted a plurality of rotor plates, spaced evenly and rigidly affixed to the rotor shaft, the rotor plates rotate with the rotor shaft. This rotor needs to be positioned in a proper position with respect to the pickup of the baler in all positions of the pickup, close enough to urge crop material against the pickup tines and far enough away from the pickup tines to not touch the pickup tines. This spacing in a dynamic sense is not easy to accomplish.

In the case of an accessory like a wind guard, it also needs to be positioned in a proper position with respect to the pickup of the baler in all positions of the pickup, close enough to urge crop material against the pickup tines and far enough away from the pickup tines to not touch the pickup tines.

Other objects, advantages and novel features of the present invention will become apparent from the following detailed description of the invention when considered in conjunction with the accompanying drawings.

DETAILED DESCRIPTION OF THE INVENTION

Figure 1:
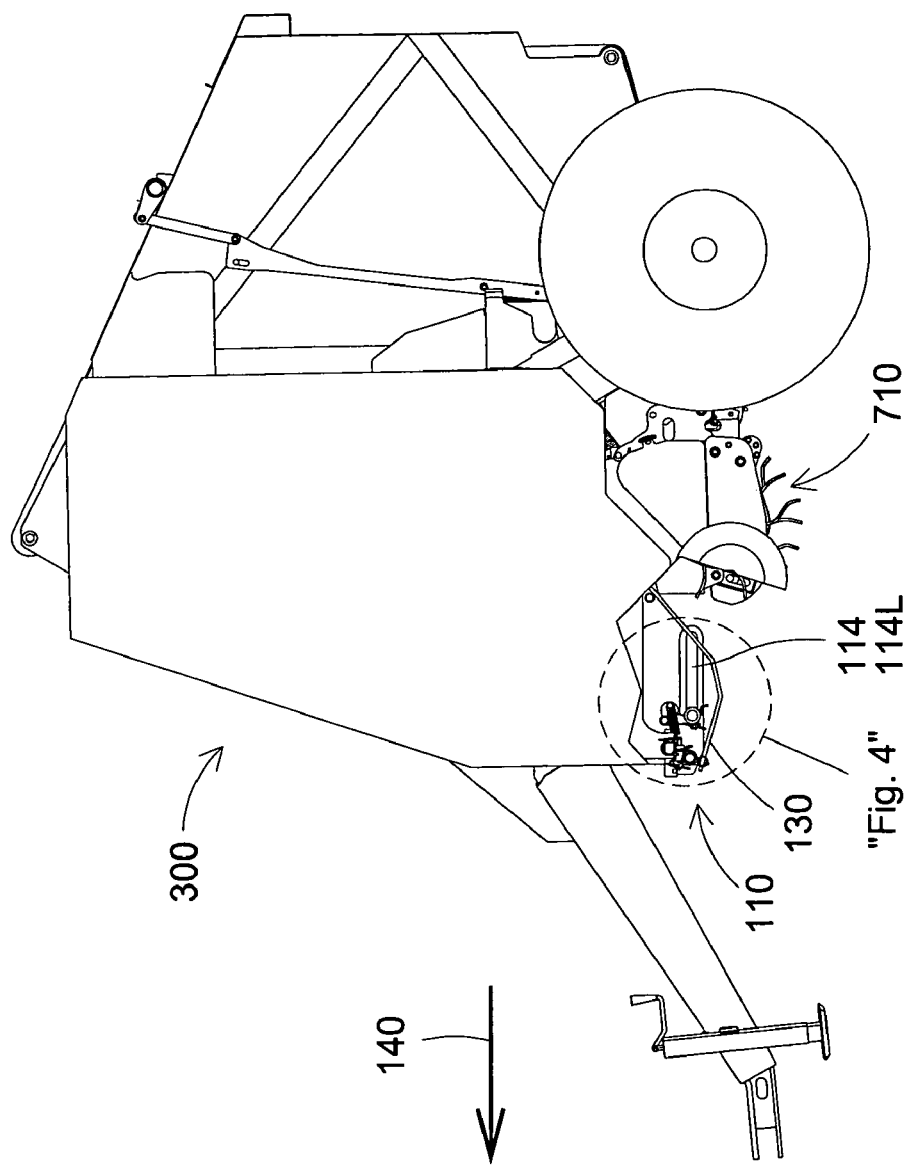
FIG. 1 is a side view of a baler in the transport position thereof.

Referring now to the drawings wherein like reference numerals correspond to the same or similar parts throughout the drawings, the present invention is shown as part of a large round baler 300 in FIGS. 3, 4, 7, and 8. The application of this invention is not limited to a large round baler, however.

Referring now to the drawings wherein like reference numerals designate identical or similar parts throughout the several views, a preferred embodiment 1 of the present invention is illustrated in FIG. 1. The baler can, for example, be like the basic baler of U.S. Pat. No. 4,910,940 to Grady, which is incorporated herein by reference in its entirety, though a more modern baler with more modern features can be used instead, for example the baler shown in U.S. Pat. No. 6,948,300 to Bandstra et.al, which is also incorporated herein by reference in its entirety. Of course it is to be understood that this invention can be used on any other type of baler, for example those that produce bales of a non-cylindrical shape, because the pickup sections of all prior art balers have crop material flow problems from time to time in the pickup sections thereof that could be solved by this invention.

U.S. patent application Ser. No. 12/193,447, filed Aug. 18, 2008, U.S. patent application Ser. No. 12/196,450, filed Aug. 22, 2008, and U.S. patent application Ser. No. 11/739,194, filed Apr. 24, 2007, all incorporated herein by reference in their entirety, show powered and un-powered rollers as well as wind guard arrangements to assist a baler pickup to move crop from the ground and into the inlet of a baler.

In FIG. 1 a baler 300 is shown being towed in a forward direction 140. When the pickup 710 is lowered to the FIG. 2 position with tines 711 thereon rotating about an axis A7 in clockwise direction shown in FIG. 2, cut crop (not shown) on the ground will be lifted and transported to an inlet 510 of a baling chamber 510 of the baler 300.

Figure 2:
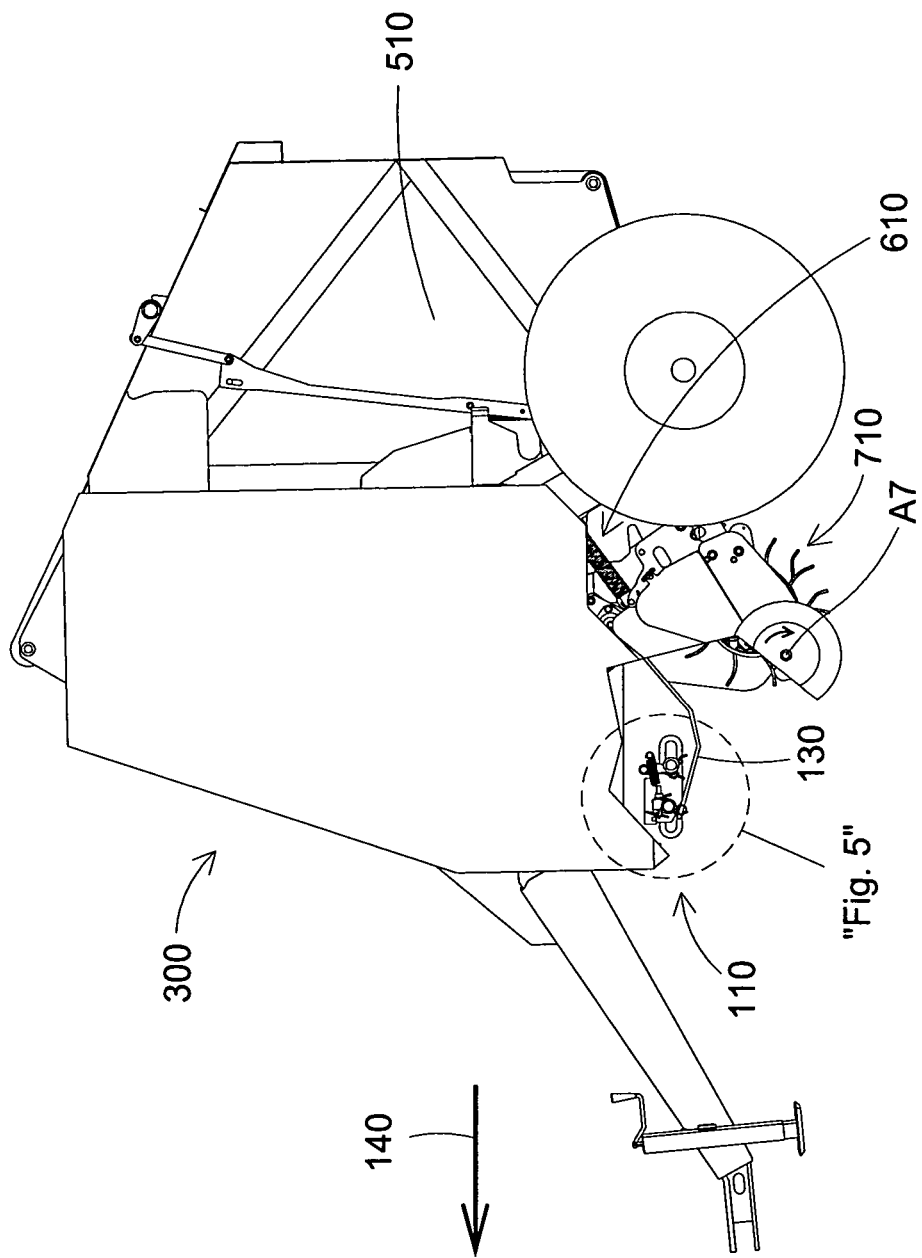
FIG. 2 is a side view of a baler in the baling position thereof.
Figure 3:
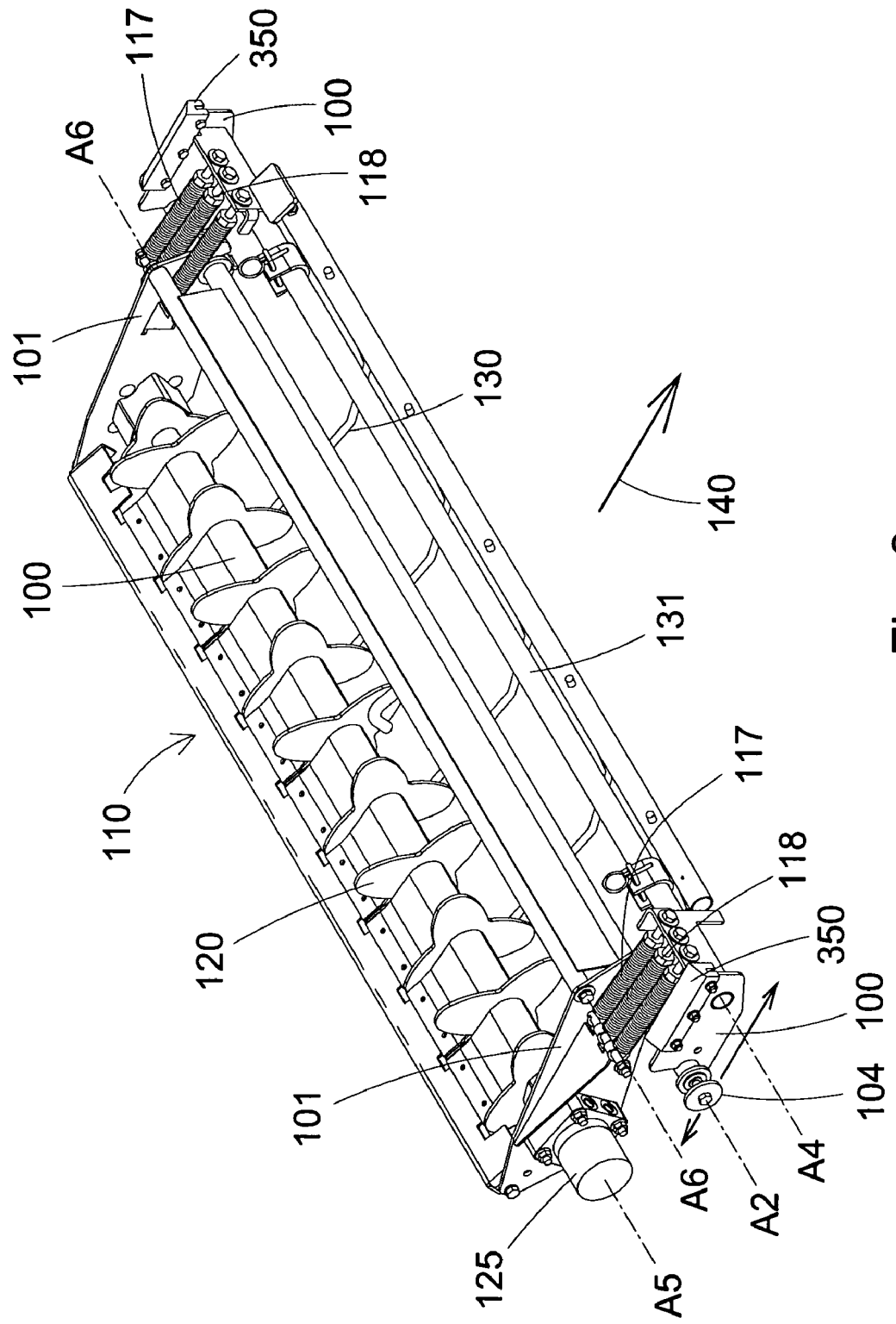
FIG. 3 is a perspective view of a powered baler rotor assembly.
Figure 7:
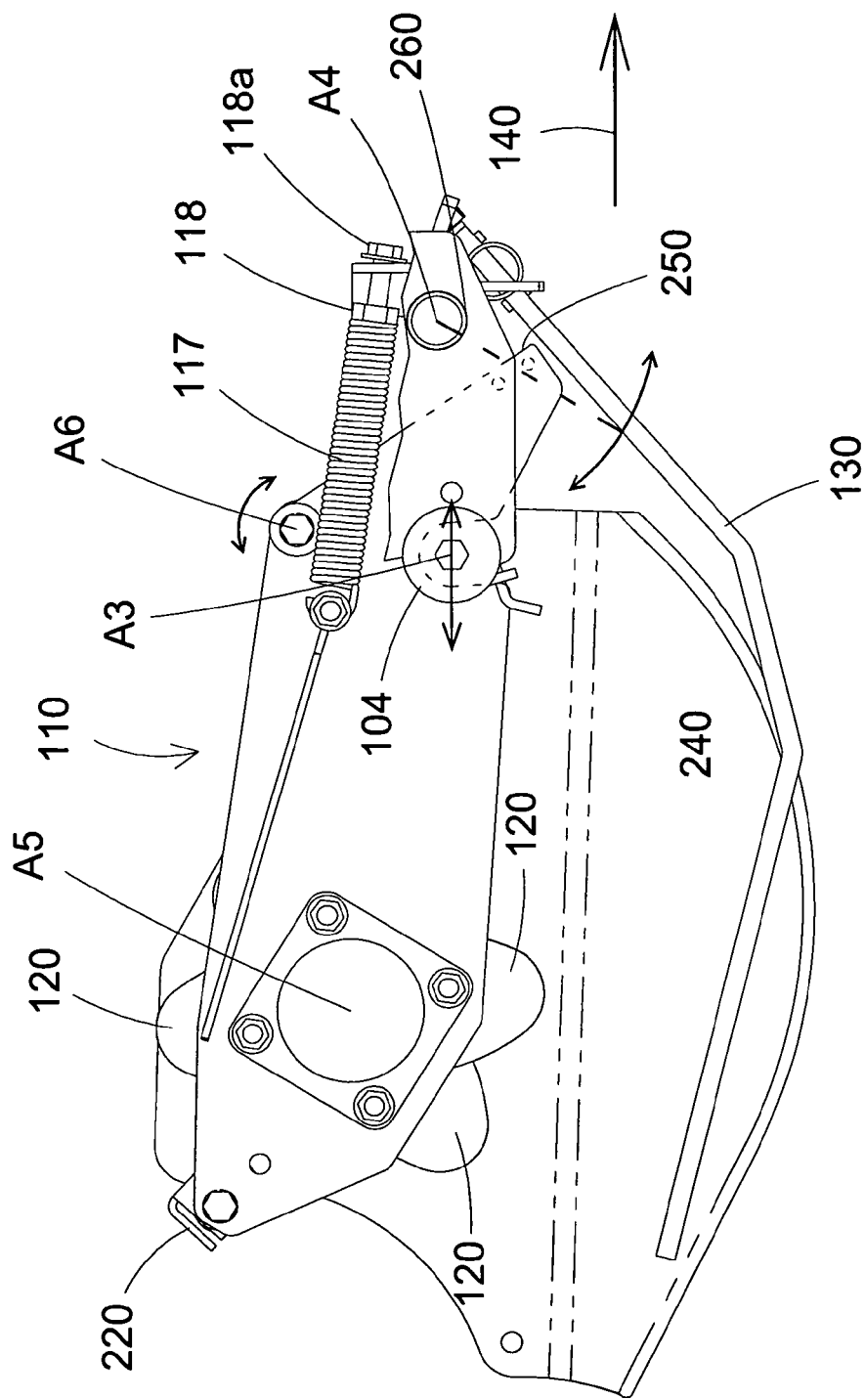
FIG. 7 is an enlarged detailed view of the large round baler in the transport position thereof with the powered rotor up.
Figure 8:
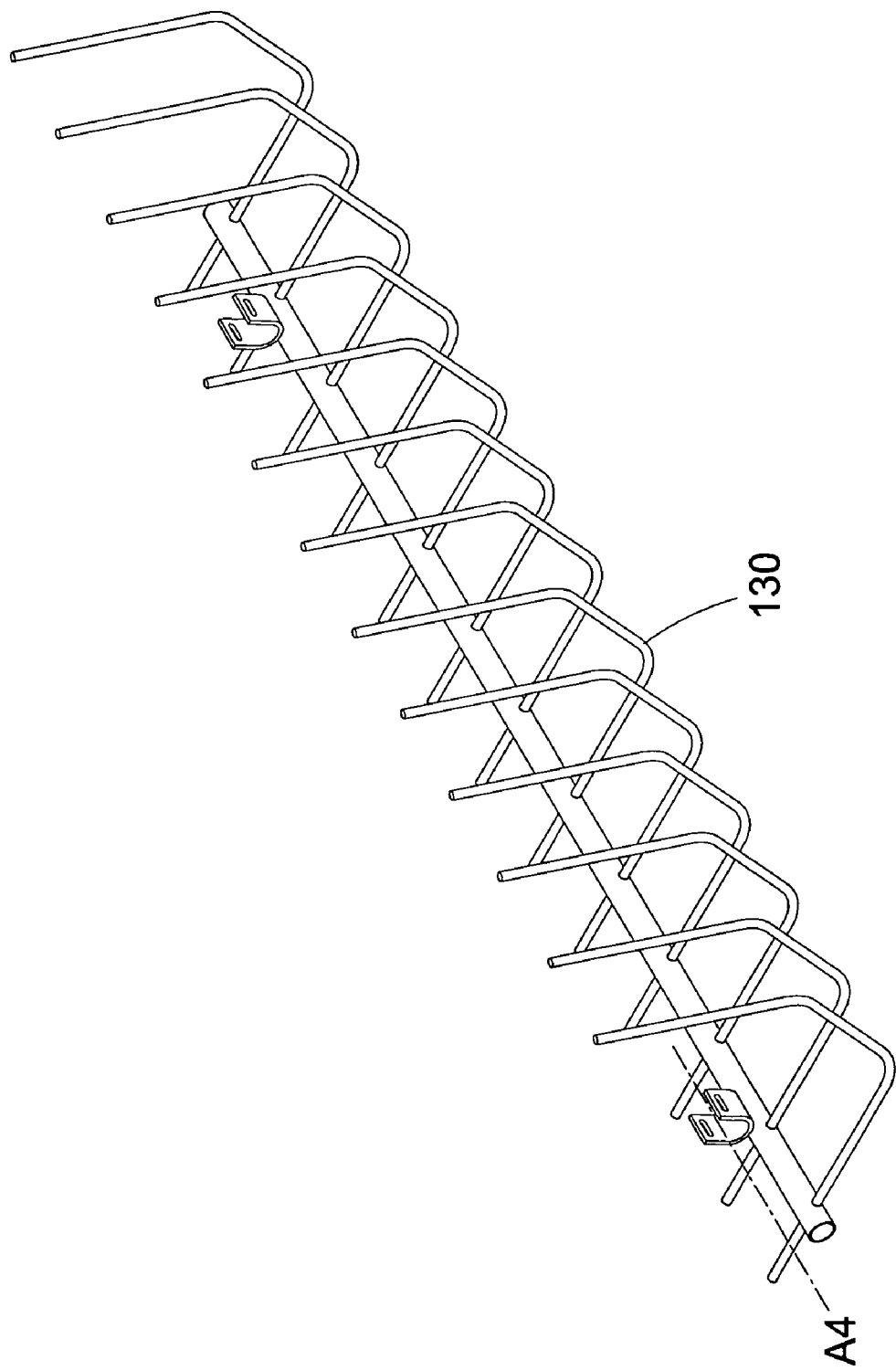
FIG. 8 is a perspective view of a baler rod wind guard.

Referring to FIG. 3, a rotor assembly 110 is illustrated comprising a plurality of rotor plates 120 (all rotor plates are not numbered) with anti-wrap oversleeves 100 disposed between all the rotor plates 120, and a rod wind guard 130. A rotor shaft 210, upon which the rotor plates are affixed, is not seen in FIG. 1, but may be viewed in FIG. 2. The forward direction 140 is shown in FIGS. 1, 7, and 8, and is defined for the purposes of this document, including the claims, as the usual operating direction of the implement, in this case, a large round baler 300. Likewise, the front of the implement 300 is the leading portion of the implement 300 when traveling in the forward direction. The rear of the implement is opposite the front.

Figure 3A:
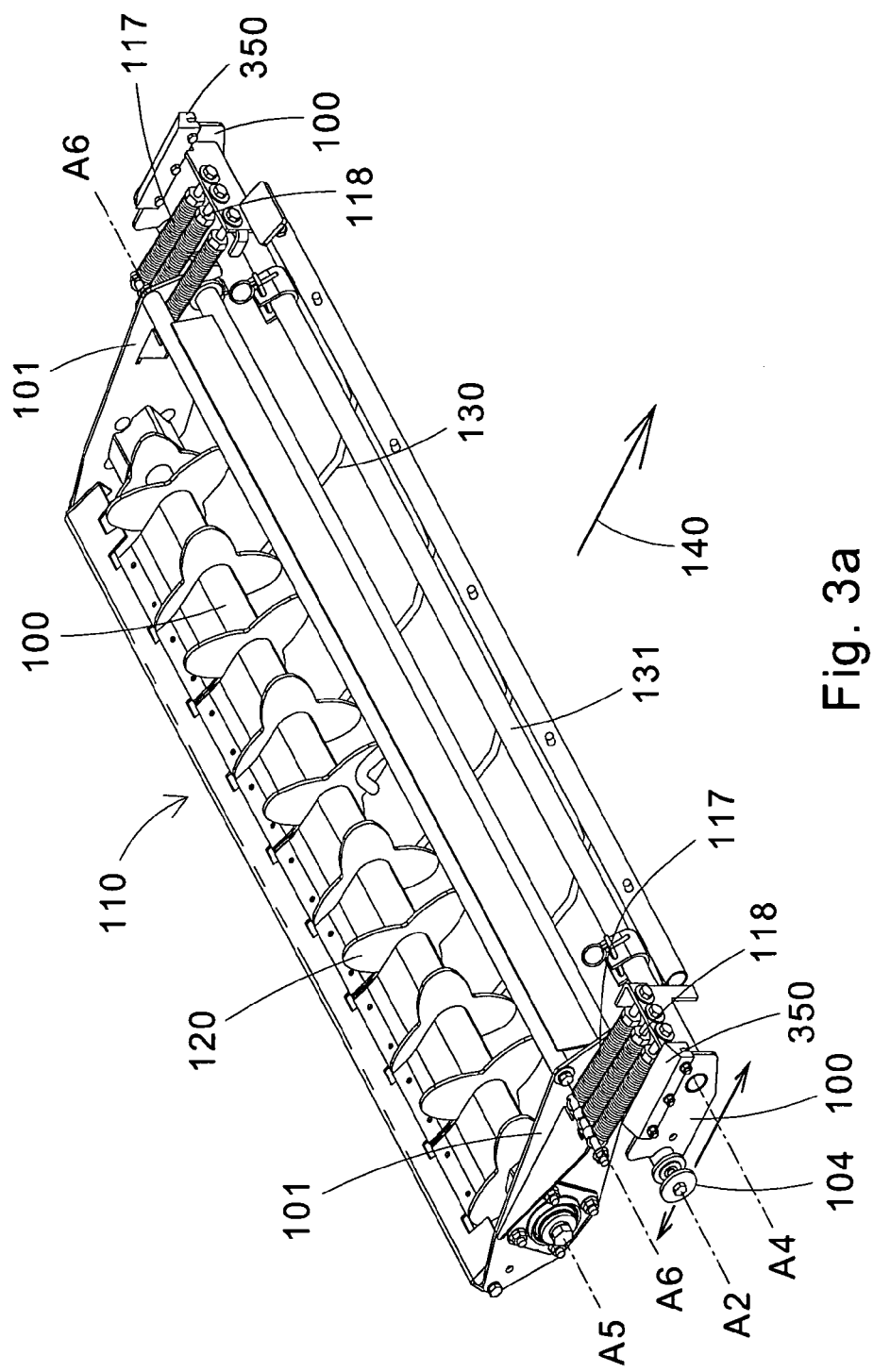
FIG. 3a is a perspective view of a non-powered baler rotor assembly.
Figure 4A:
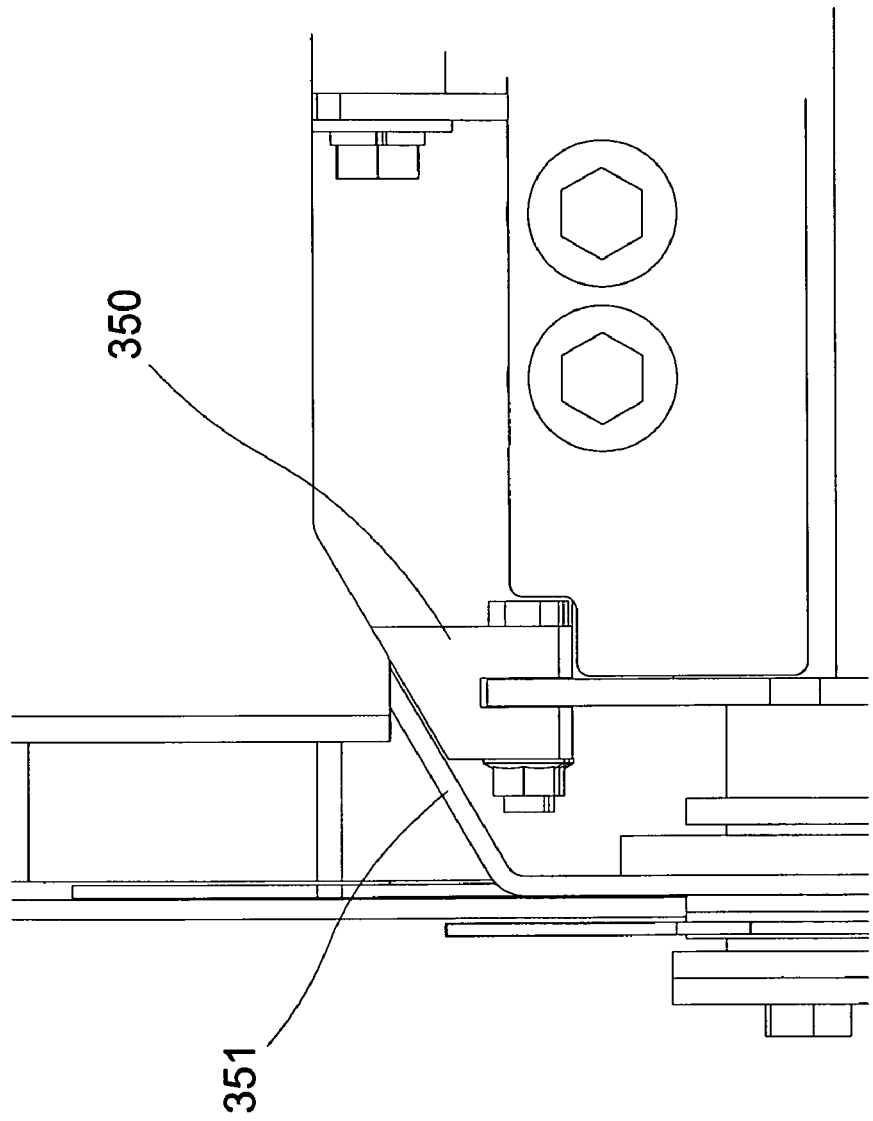
FIG. 4 is an enlarged detailed view of dashed line portion of FIG. 1 with the large round baler in the transport position thereof with the pickup assembly up.

The rotor, comprising the rotor plates 120 and the rotor shaft 210 may be hydraulically driven such as by the hydraulic motor 125 in FIG. 3 or the motor 125 can be absent as shown in FIG. 3a so it will be driven by the flow of crop material over or under the rotor blades 120.

Figure 6:
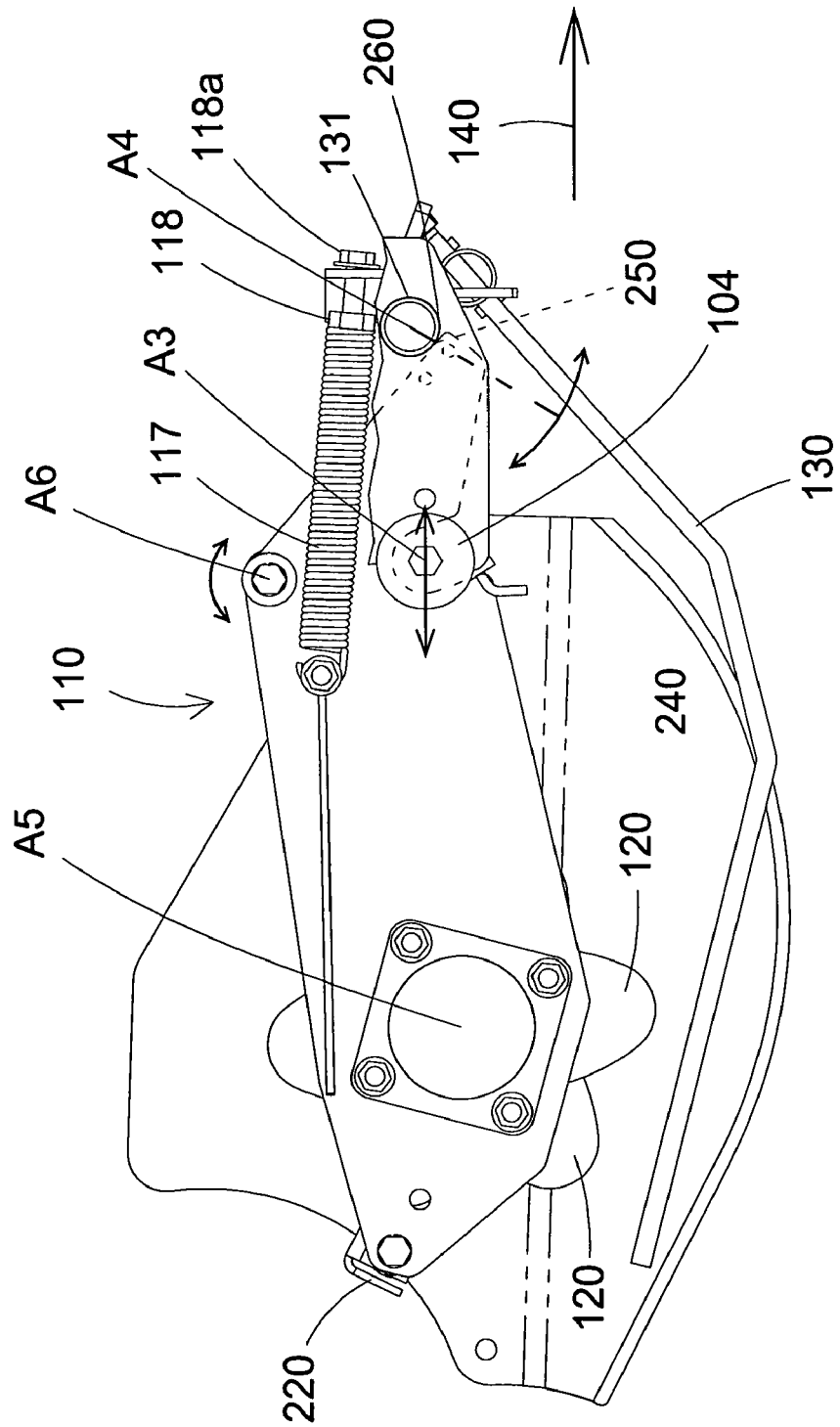
FIG. 6 is an enlarged detailed view with the large round baler in the baling position thereof with the powered rotor down.

Looking to FIGS. 6 and 7, as the rotor assembly is rotated downward, a point 250 gets closer to the bottom of a tube 260. When the point 250 contacts the bottom of the tube 260, rotation ceases. In the preferred embodiment, looking at FIGS. 4 and 4a, as the rotor assembly rotates upward, the slide plate 350 contacts the bottom of a plate 351 on the baler frame to limit upward rotation on the front end an thus limits downward movement on the rear end of the slide frame. In alternate embodiments, this plate 350 may be mounted on the non-rotating portion of the wind guard 130, or there could be a point or stop similar to 250 on the opposite side of the tube 260 to contact the top of the tube 260 to limit rotation.

The rotor assembly 110 is shown installed on a large round baler 300 in FIGS. 1 and 2. The rotor, comprising the rotor plates 120 and the rotor shaft 210 (not shown in FIGS. 1 and 2), is shown in a lowered position in FIGS. 2 and 5, whereas the rotor is shown in a raised position in FIGS. 1 and 4.

Figure 5:
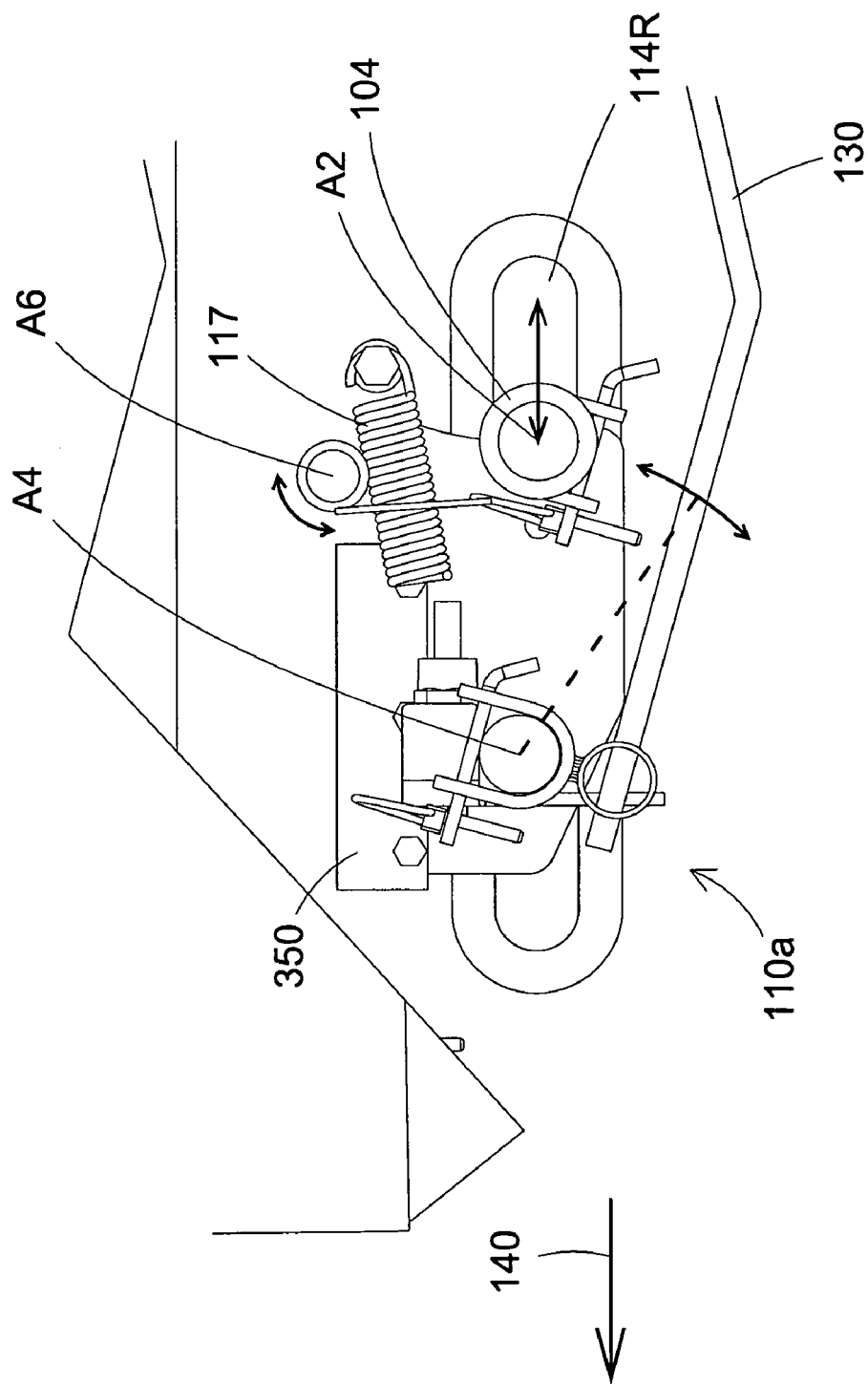
FIG. 5 is an enlarged detailed view of dashed line portion of FIG. 2 with the large round baler in the operational baling position thereof with the pickup assembly down.

In FIGS. 6 and 7, detail views of the rotor assembly 110 are shown corresponding to FIGS. 1 and 2, respectively. In FIG. 6, the rotor, comprising the rotor plates 120 and the rotor shaft 210 is shown in a lowered position. In FIG. 7, the rotor is shown in a raised position. Comparing FIG. 6 to FIG. 7, note that the stripper pan 220 is raised and lowered simultaneously with the rotor shaft 210. Crop fin members 240 are disposed at both ends of the rotor. Only one crop fin 240 is shown in FIGS. 2, 5, and 6. The crop fin members 240 are intended to help guide crop material into the rotor assembly 110. The crop fin members 240 can also function to move the rotor assembly 110 fore and aft.

The rotor assembly 110 is permitted to move fore and aft, as shown in FIGS. 1, 2, 6 and 7. The rotor assembly 110 is placed in the forward position, when the pickup header 710 is in a raised position as shown in FIGS. 1 and 7. When the pickup header 710 is in a lowered position, as shown in FIGS. 2 and 6, the rotor assembly 110 is placed in the aft or rearward position.

Figure 9:
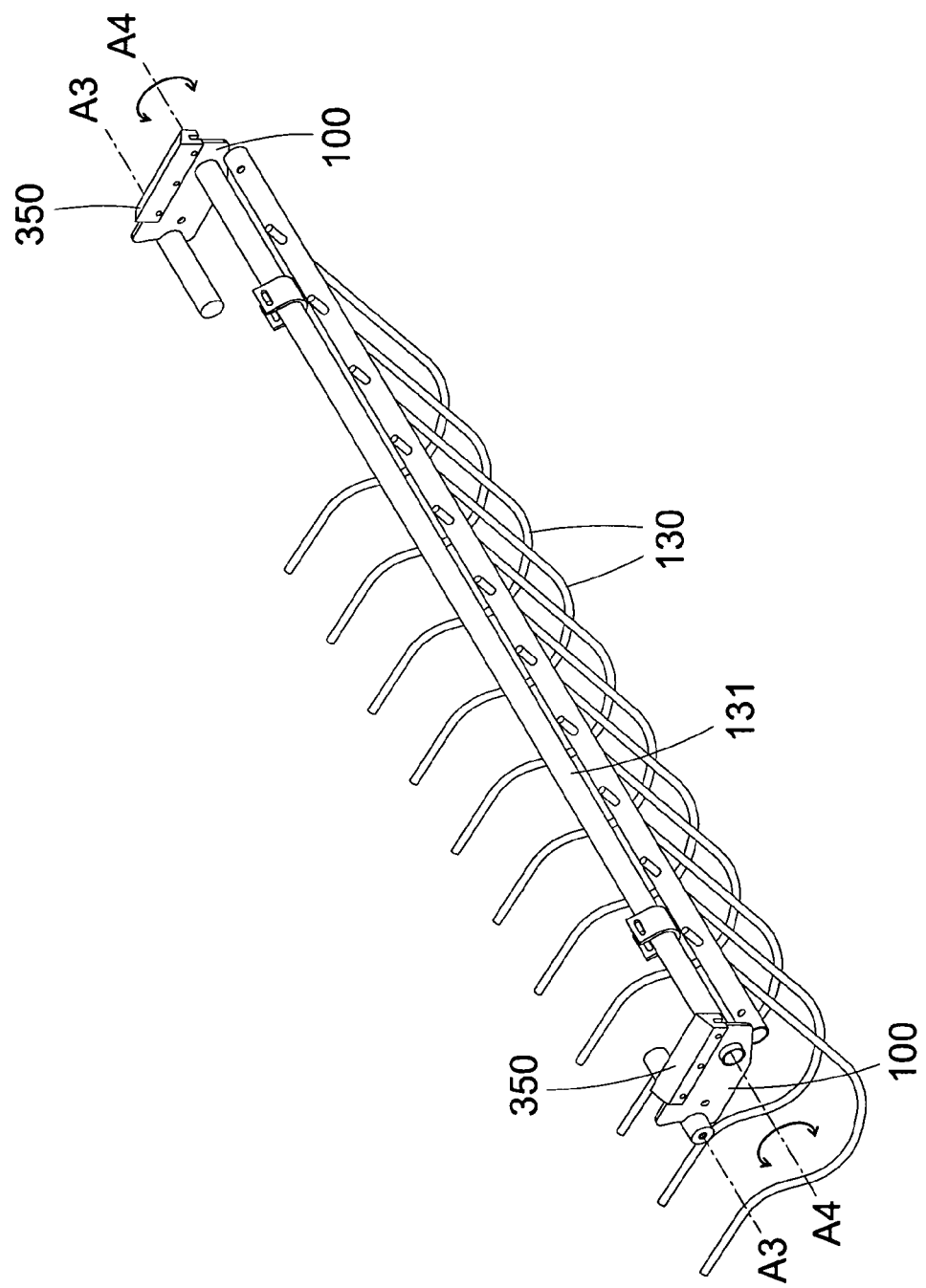
FIG. 9 is a perspective view of a baler rod wind guard attached to the slider plate.
Figure 10:
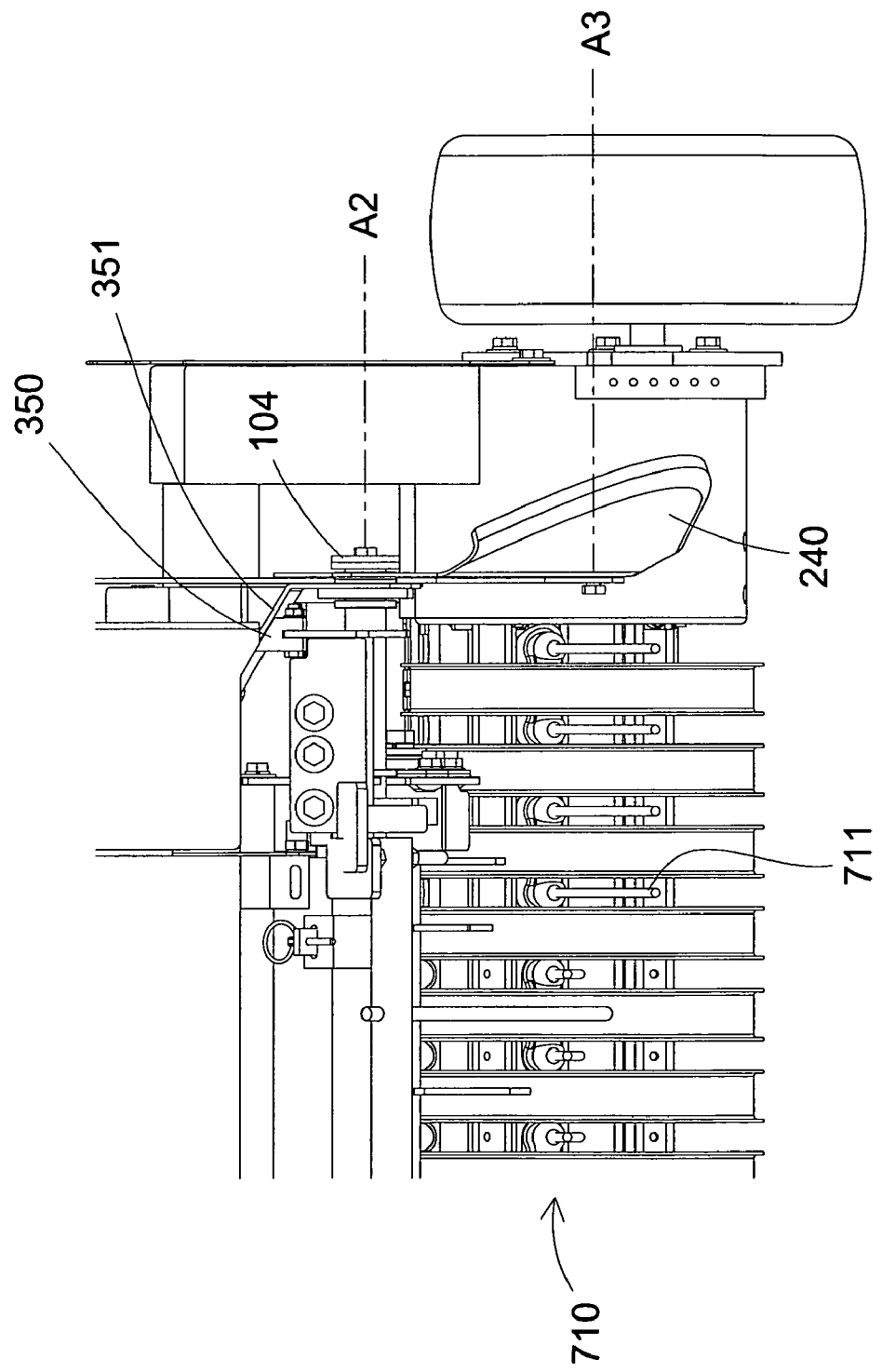
FIG. 10 is an enlarged front view of the pickup of the baler.

A view of the rod wind guard 130 alone is shown in FIGS. 1-9, with FIGS. 8 and 9 showing the wind guard 130 mostly alone in perspective views. The stripper pan 220 is preferably configured with the rod wind guard 130. The rear portion of the individual rods of the rod wind guard 130 pass through an elongated aperture in the stripper pan 220. The rods 130, then, function independently of the rotor, that is, not fixed to the rotor. The rod wind guard 130 is, therefore, permitted to rise with increased crop infeed, then drop as the crop thins out. The rear portion of the rods of the rod wind guard 130 and/or the stripper teardrop-shaped anti-wrap oversleeves 100 serve to guide the crop as well. In an additional embodiment, the rod wind guard 130 pivots only upon moving the rotor slide frame. The rods of the rod wind guard 130 are not engaged with the stripper pan 220 in this embodiment.

Figure 11:
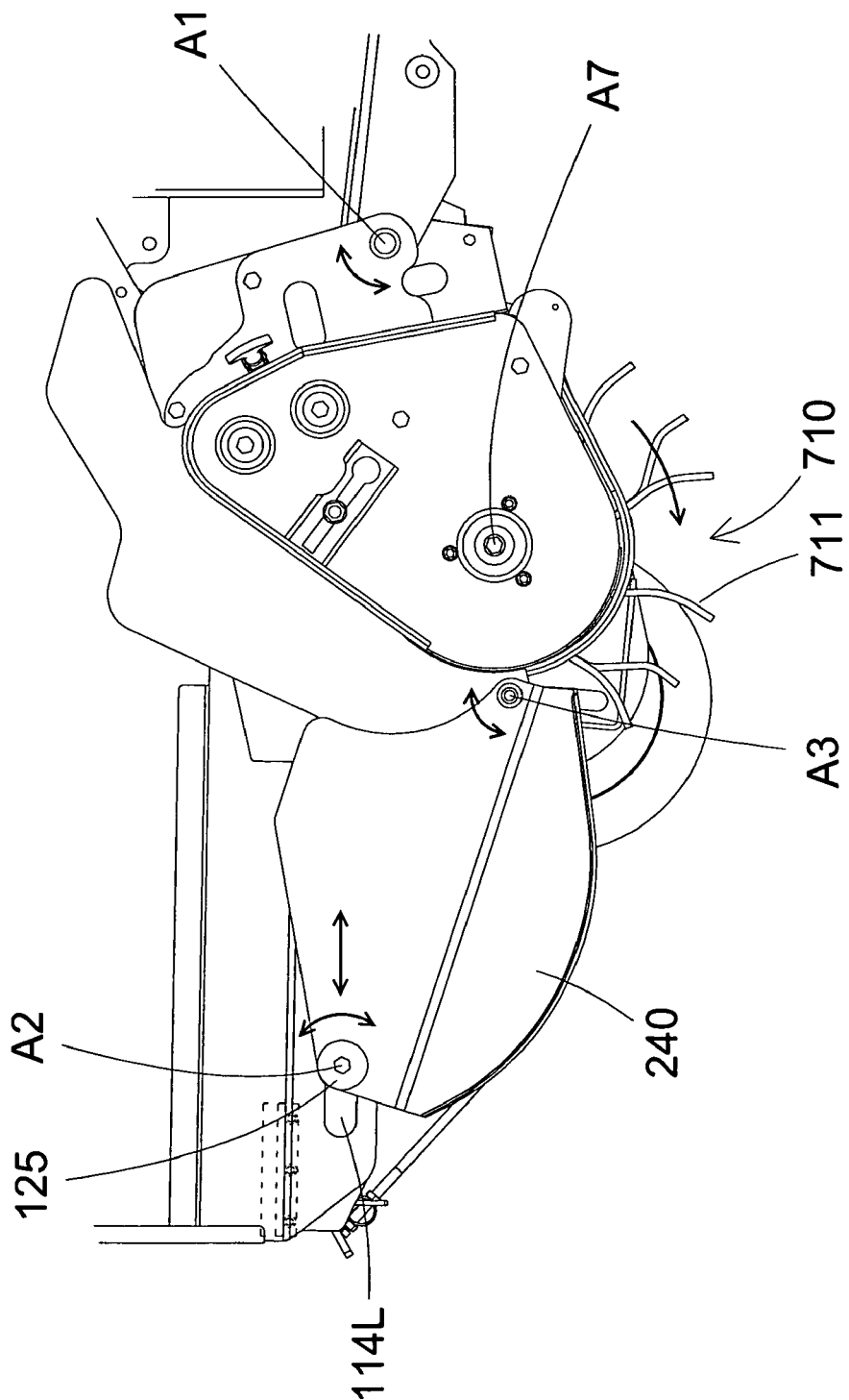
FIG. 11 is an enlarged detailed side view with the large round baler with the powered rotor and crop pickup device in the upper transport position thereof.
Figure 12:
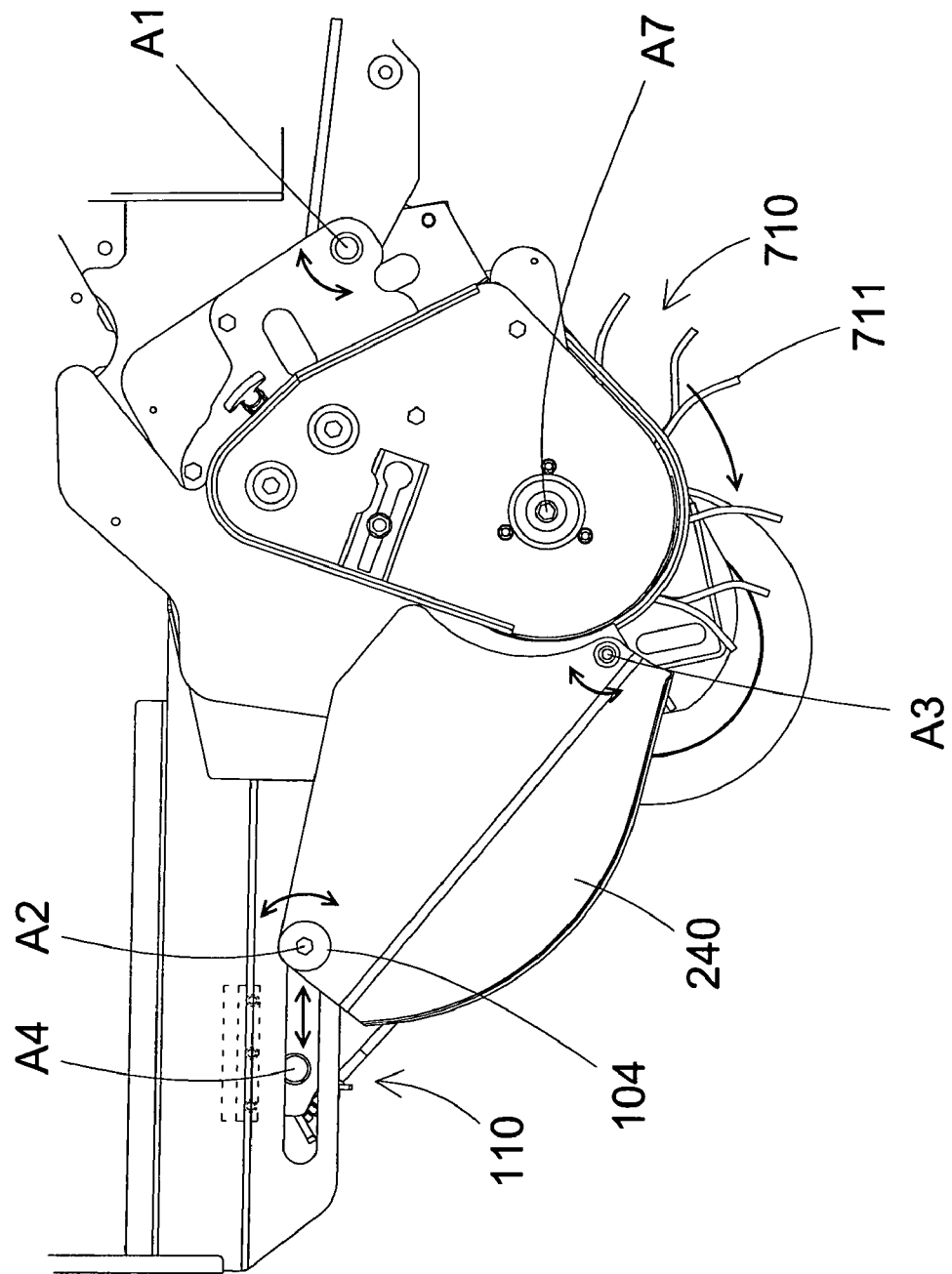
FIG. 12 is an enlarged detailed side view of the large round baler in the lowered operational baling position thereof showing the pickup assembly and the crop pickup device in the lowest position thereof.

In operation, a baler 300 having a main frame with a front and a rear, a baling chamber 510 having a baling chamber inlet 610 uses a rotary crop pickup device 710 operatively pivotally attached to the main frame along a first pivotal axis (A1) to pick up cut crops from the ground. The rotary crop pickup device 710 is of a type having spaced apart pickup tines 711 that rotate about a rotational axis A7 (FIG. 11) in one direction (which is clockwise in FIG. 11) for picking up crop from the ground and moving the crop to the inlet 610 of the baling chamber. The rotary crop pickup device 710 has a raised transport position (FIG. 1) and a lowered working position (FIG. 2) and is moveable between the raised transport position and the lowered working position.

A left side mostly horizontally disposed slot 114L is fixed with respect to the main frame. A right side mostly horizontally disposed slot 114R is fixed with respect to the main frame.

A slider frame (100, FIG. 3) is adapted to mount at least one accessory thereon for assisting the rotary crop pickup device. This slider frame 100 has a left side bearing 104 extending through the left side slot in the left side panel, and a mirror image right side bearing 104 extending through the right side slot 114R in the right side panel for permitting the slider main frame 100 to move between a forward position in the slots 114L and 114R to a rearward position in the slots and to pivot about a second axis (A2) which second axis (A2) is always disposed in the left and right side slots 114L and 114R respectively.

A left side member 101 is pivotally attached to the slider frame about the second axis (A2) and is operatively attached to the rotary crop pickup device along a third axis (A3) as shown in FIG. 3. A right side member 101 pivotally attached to the slider frame about the second axis (A2) and is operatively attached to the rotary crop pickup device along a third axis (A3) whereby when the rotary crop pickup device 710 is in the raised transport position the left and right side bearings 104 of the slider frame 100 are in a forward position of the left and right side slots 114L and 114R and when the rotary crop pickup device is in the lowered operative position the left and right side bearings 104 of the slider frame 100 are in a rearward position of the left and right side slots as shown in FIGS. 1, 2, 4 and 5.

The accessory attached to the slider frame in FIGS. 4 and 5 is a wind guard 130 pivotally attached thereto along a fourth axis (A4), said fourth axis being fixed with respect to said slider frame. The wind guard comprises a plurality of rods 130 extending rearwardly from the fourth axis (A4) toward the rotary crop pickup device 710 for tending to push crop against the tines 711 of the rotary crop pickup device 710.

In a preferred embodiment all of the first through seventh axes (A1-A7) are respectively substantially parallel to each other.

When the accessory attached to the slider frame 100 is a rotor with blades 120 thereon the rotor is rotatable about a fifth axis (A5) and rotatable in a direction opposite to the direction of rotation of the rotary crop pickup device 710 for urging crop disposed between the tines 711 of the rotary crop pickup device 710 and the rotor to pass towards the baling chamber 610.

In FIG. 3 the rotor is a power rotor, preferably a hydraulic motor 125. In FIG. 3a the rotor rotates due to the passing of the crop between the rotor blades and the tines of the rotary crop pickup device, i.e. it has no motor like motor 125 of FIG. 3.

The slide blocks 350 on each side of the device 110 shown in FIG. 3, are disposed on a front upper portion of the slider frame 100 for engaging and sliding along a plate 351 on the baler above the slide blocks 350 for limiting the degree to which the slider frame can pivot downwardly in the rear thereof about the sixth axis (A6).

Since the rotor part 101 is operatively pivotally attached along a sixth axis (A6) to the slide frame 100, it is moveable between a lower position close to the rotary crop pickup device 710 and an upper position spaced farther from the rotary crop pickup device 710. Several tension springs 117 are operatively attached at one end thereof to the slider frame 100 and operatively attached at another end thereof to the rotor plate 101 to apply a force tending to help rotate the rotor upwardly about the sixth axis (A6) when the crop passes between the rotor and the rotary crop pickup device. Nuts 118 can be adjusted to adjust the tension on tension springs 117, as is well known in this art.

The stop mechanism 250 associated with the rotor 110 and the slider frame 100 is used to prevent the rotor 110 from pivoting beyond a predetermined angle downwardly about the sixth axis (A6) thereby preventing the rotor blades 120 from contacting the rotary crop pickup device 710.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. Apparatus comprising:

a baler having a main frame with a front and a rear, a left side panel operatively attached to the main frame and a right side panel operatively attached to the main frame, a baling chamber having a baling chamber inlet;

a rotary crop pickup device operatively pivotally attached to the main frame along a first pivotal axis (A1), the rotary crop pickup device having spaced apart pickup tines that rotate in one direction about a rotational axis (A7) for picking up crop from the ground and moving the crop to the inlet of the baling chamber, said rotary crop pickup device having a raised transport position and a lowered working position and being moveable between the raised transport position and the lowered working position;

a left side mostly horizontally disposed slot which is fixed with respect to the main frame;

a right side mostly horizontally disposed slot which is fixed with respect to the main frame;

a slider frame adapted to mount at least one accessory thereon for assisting the rotary crop pickup device, said slider frame having a left side bearing extending through the left side slot in the left side panel, and a right side bearing extending through the right side slot in the right side panel for permitting the slider main frame to move between a forward position in the slots to a rearward position in the slots and to pivot about a second axis (A2) which second axis (A2) is always disposed in the left and right side slots, said second axis (A2) being fixed with respect to the slider frame;

a left side member pivotally attached to the slider frame about the second axis (A2) and is operatively attached to the rotary crop pickup device along a third axis (A3); and a right side member pivotally attached to the slider frame about the second axis (A2) and is operatively attached to the rotary crop pickup device along a third axis (A3) whereby when the rotary crop pickup device is in the raised transport position the left and right side bearings of the slider frame are in a forward position of the left and right side slots and when the rotary crop pickup device is in the lowered operative position the left and right side bearings of the slider frame are in a rearward position of the left and right side slots.

2. The apparatus of claim 1 wherein the accessory attached to the slider frame is a wind guard pivotally attached thereto along a fourth axis (A4), said fourth axis being fixed with respect to said slider frame.

3. The apparatus of claim 2 wherein all of the first, second, third and fourth axes are respectively substantially parallel to each other.

4. The apparatus of claim 2 wherein the wind guard comprises a plurality of rods extending rearwardly from the fourth axis (A4) toward the rotary crop pickup device for tending to push crop against the tines of the rotary crop pickup device.

5. The apparatus of claim 1 wherein the accessory attached to the slider frame is a rotor with blades thereon operatively attached to the slider frame, said rotor being rotatable about a fifth axis (A5) and rotatable in a direction opposite to the direction of rotation of the rotary crop pickup device for urging crop disposed between the tines of the rotary crop pickup device and the rotor to pass towards the baling chamber.

6. The apparatus of claim 5 wherein the rotor is a power rotor.

7. The apparatus of claim 6 wherein the rotor is rotated by a hydraulic motor.

8. The apparatus of claim 5 wherein the rotor rotates due to the passing of the crop between the rotor blades and the tines of the rotary crop pickup device.

9. The apparatus of claim 2 wherein the accessory attached to the slider frame is a rotor with blades thereon operatively attached to the slider frame, said rotor being rotatable about a fifth axis (A5) and rotatable in a direction opposite to the direction of rotation of the rotary crop pickup device for urging crop disposed between the tines of the rotary crop pickup device and the rotor to pass towards the baling chamber.

10. The apparatus of claim 9 wherein the rotor is a power rotor.

11. The apparatus of claim 10 wherein the rotor is rotated by a hydraulic motor.

12. The apparatus of claim 9 wherein the rotor rotates due to the passing of the crop between the rotor blades and the tines of the rotary crop pickup device.

13. The apparatus of claim 9 wherein the wind guard comprises a plurality of rods extending rearwardly from the fourth axis (A4) toward the rotary crop pickup device for tending to push crop against the tines of the rotary crop pickup device.

14. The apparatus of claim 1 including at least one slide block disposed on a front upper portion of the slider frame for engaging and sliding along a plate on the baler above the slide block for limiting the degree to which the slider frame can pivot downwardly about the sixth axis (A6).

15. The apparatus of claim 5 wherein the rotor is operatively pivotally attached along a sixth axis (A6) to the slide frame and moveable between a lower position close to the rotary crop pickup device and an upper position spaced farther from the rotary crop pickup device.

16. The apparatus of claim 15 including at least one tension spring operatively attached at one end thereof to the slider frame and operatively attached at another end thereof to the rotor to apply a force tending to help rotate the rotor upwardly about the sixth axis (A6) when the crop passes between the rotor and the rotary crop pickup device.

17. The apparatus of claim 16 including means for adjusting the tension force of the at least one spring.

18. The apparatus of claim 16 including a stop mechanism associated with the rotor and the slider frame to prevent the rotor from pivoting beyond a predetermined angle downwardly about the sixth axis (A6) thereby preventing the rotor from contacting the rotary crop pickup device.

19. The apparatus of claim 18 including means for adjusting the tension force of the at least one spring.

20. The apparatus of claim 19 wherein all of the first, second, third, fifth and sixth axes are respectively substantially parallel to each other.

* * * * *